(12) United States Patent
Svara et al.

(10) Patent No.: US 9,677,640 B2
(45) Date of Patent: Jun. 13, 2017

(54) DAMPER ASSEMBLIES

(71) Applicant: Titus International PLC, Uxbridge, Middlesex (GB)

(72) Inventors: Valter Svara, Izola (SI); Danijel Kozlovic, Dekani (SI); David Pecar, Pobegi (SI)

(73) Assignee: Titus International PLC, Middlesex (GB)

( * ) Notice: Subject to any disclaimer, the term of this patent is extended or adjusted under 35 U.S.C. 154(b) by 0 days.

(21) Appl. No.: 14/374,283

(22) PCT Filed: Jan. 24, 2013

(86) PCT No.: PCT/GB2013/050152
§ 371 (c)(1),
(2) Date: Jul. 24, 2014

(87) PCT Pub. No.: WO2013/110939
PCT Pub. Date: Aug. 1, 2013

(65) Prior Publication Data
US 2015/0014107 A1  Jan. 15, 2015

(30) Foreign Application Priority Data
Jan. 24, 2012 (GB) .................................. 1201273.8

(51) Int. Cl.
F16F 9/32 (2006.01)
F16F 9/34 (2006.01)
(Continued)

(52) U.S. Cl.
CPC .............. *F16F 9/3405* (2013.01); *F16F 9/18* (2013.01); *F16F 9/3228* (2013.01); *F16F 9/443* (2013.01); *F16F 9/003* (2013.01)

(58) Field of Classification Search
CPC ...... F16F 9/3214; F16F 9/3221; F16F 9/3228; F16F 9/3405; F16F 9/48; F16F 9/516;
(Continued)

(56) References Cited

U.S. PATENT DOCUMENTS 4,433,759 A * 2/1984 Ichinose ................. E05C 17/30
16/51
5,560,454 A 10/1996 Jensen et al.
(Continued)

FOREIGN PATENT DOCUMENTS

CN 101655133 A 2/2010
CN 201827283 U1 5/2011
(Continued)

*Primary Examiner* — Anna Momper
(74) *Attorney, Agent, or Firm* — Alan D. Kamrath; Kamrath IP Lawfirm, P.A.

(57) ABSTRACT

A damper assembly includes a piston and cylinder type damper with a piston (14) mounted for reciprocal movement in a cylinder (10) containing damping fluid. The piston (14) is acted on by a piston rod (11) which includes a reaction surface for engaging the piston. The cross-sectional area of the reaction surface is designed to be significantly greater than the cross-sectional area of the piston rod (11) in order to spread the load exerted on the piston (14). Also, the piston (14) is designed to engage the piston rod (11) at its inner end in a manner that provides lateral guidance for the inner end of the piston rod in its movement in the cylinder (10).

23 Claims, 2 Drawing Sheets

(51) Int. Cl.
*F16F 9/18* (2006.01)
*F16F 9/44* (2006.01)
*F16F 9/00* (2006.01)

(58) Field of Classification Search
CPC .. F16F 9/003; F16F 9/18; F16F 9/3235; F16F 9/346; F16F 9/3465; F16F 9/5165; F16F 9/443
USPC .... 188/281, 282.1, 283, 284, 285, 288, 289, 188/316, 317, 322.15, 322.22
See application file for complete search history.

(56) References Cited

U.S. PATENT DOCUMENTS

| | | | |
|---|---|---|---|
| 5,799,759 A * | 9/1998 | Koch | F16F 9/0245 188/288 |
| 5,927,448 A * | 7/1999 | Yamazaki | F16F 9/10 188/280 |
| 6,615,450 B2 | 9/2003 | Salice | |
| 7,377,500 B2 | 5/2008 | Tomiji et al. | |
| 7,410,154 B2 | 8/2008 | Lam et al. | |
| 7,431,135 B2 | 10/2008 | Vanbrabant | |
| 8,468,652 B2 | 6/2013 | Salice | |
| 2002/0020595 A1 | 2/2002 | Adamek et al. | |
| 2005/0263362 A1 | 12/2005 | Oota et al. | |
| 2011/0253493 A1 | 10/2011 | Svara et al. | |
| 2013/0118846 A1 | 5/2013 | Zimmer et al. | |

FOREIGN PATENT DOCUMENTS

| | | |
|---|---|---|
| EP | 2128482 A1 | 12/2009 |
| EP | 2243573 A2 | 10/2010 |
| ES | 2275403 A1 | 6/2007 |

* cited by examiner

DAMPER ASSEMBLIES

This invention relates to damper assemblies and, in particular, though not exclusively, to damper assemblies for cushioning movement of furniture parts such as doors or drawers.

The invention provides a damper assembly comprising a piston and cylinder type damper with a piston mounted for reciprocal movement in a cylinder containing damping fluid, with the piston being acted upon by a piston rod. The piston rod comprises a reaction surface for engaging the piston, with the cross-sectional area of the reaction surface being significantly greater than the cross-sectional area of the piston rod in order to spread the load exerted on the piston. The piston engages the piston rod at an inner end thereof in a manner to provide lateral guidance for the inner end of the piston rod in its movement in the cylinder.

The invention also provides a damper assembly comprising a piston and cylinder type damper with a piston mounted for reciprocal movement in a cylinder containing damping fluid. The piston divides the interior of the cylinder into two chambers and has a pathway therethrough for passage of damping fluid between the chambers, and the assembly further comprises means for adjusting the size of said pathway.

Figure 1:
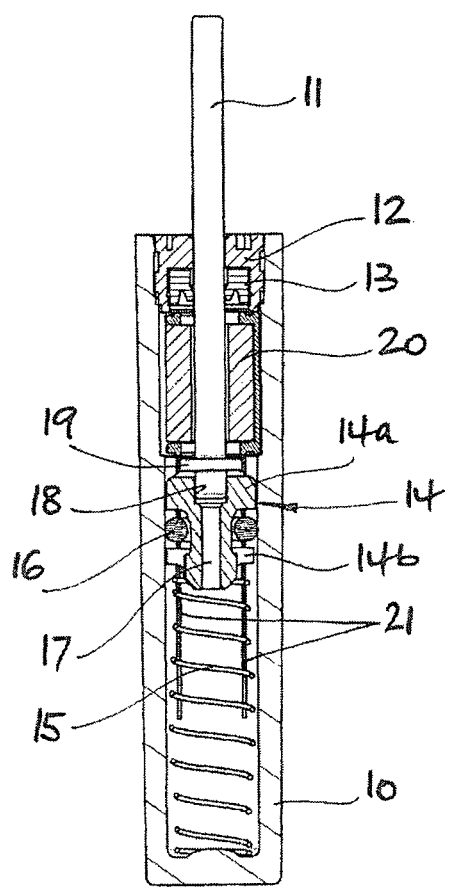
Figure 3:
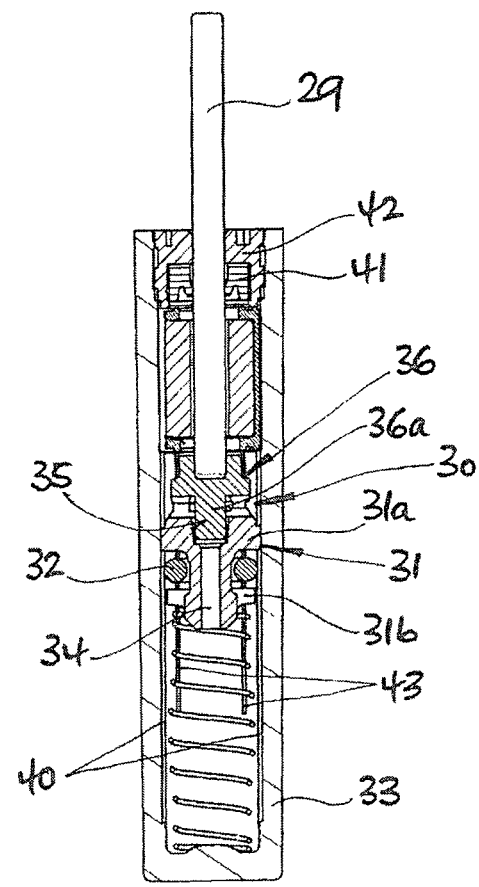
Figure 2:
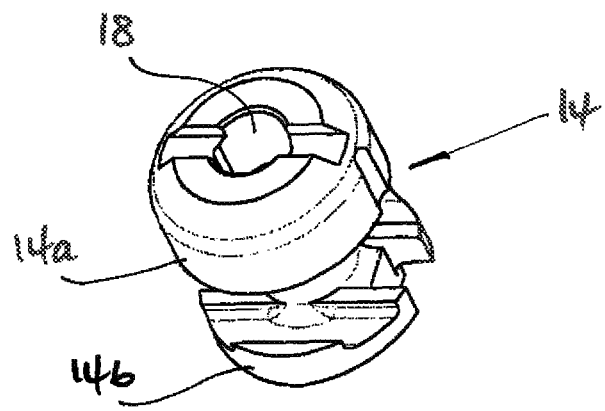
Figure 5:
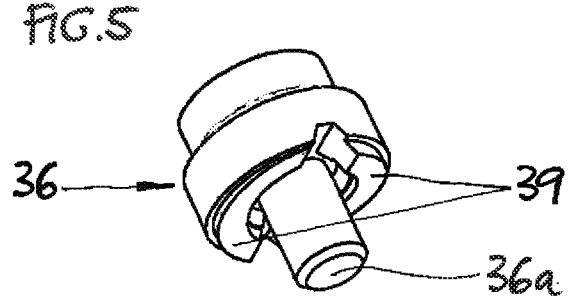
Figure 4:
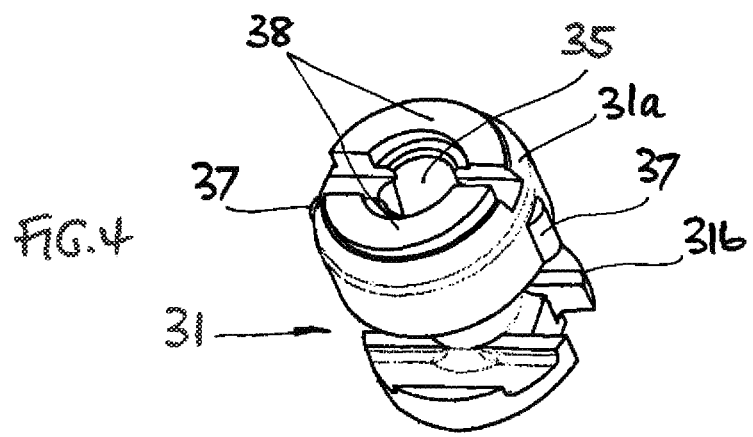

By way of example, embodiments of the invention will now be described with reference to the accompanying drawings, in which:

FIG. 1 is a cross-sectional view of a first embodiment of a damper assembly according to the invention, FIG. 2 shows the piston of the FIG. 1 assembly, FIG. 3 is a cross-sectional view of a second embodiment of a damper assembly according to the invention, and FIGS. 4 and 5 show the composite piston assembly of the FIG. 3 assembly.

The damper assembly seen in FIG. 1 comprises an elongate cylinder 10 which is closed at one end, and a piston rod 11 arranged for reciprocal movement along the longitudinal axis of the cylinder. The piston rod 11 is conveniently formed from plain rod stock of circular cross-section. The cylinder 10 is conveniently of plastics.

The piston rod 11 extends into the cylinder 10 through a hole in an end cap 12 and is surrounded by a seal 13. The end cap 12 is fixed to the cylinder 10 and seals off its open end, thus creating an enclosed inner space within the cylinder. The inner space contains a damping fluid such as oil.

At its inner end, the piston rod 11 is designed to engage a piston 14. The piston 14 is conveniently made of plastics and effectively divides the inner space within the cylinder 10 into separate chambers. A compression spring 15 arranged in one of the chambers between the closed end of the cylinder 10, and the piston 14 acts to bias the piston rod 11 towards its extended position (seen in FIG. 1).

The piston 14 comprises outer and inner flanges 14a, 14b, as seen more clearly in FIG. 2. The outer diameter of the flanges 14a, 14b is slightly less than the bore of the cylinder 10. This means that the piston 14 is able to move freely within the cylinder 10 along its longitudinal axis. It also means that there is a small gap between the flanges 14a, 14b and the cylinder 10, which constitutes a pathway for the passage of damping fluid between the chambers.

The flanges 14a, 14b are spaced apart axially, and in the space between them is located a seal 16, preferably in the form of an O-ring. The seal 16 is in sealing engagement with the bore of the cylinder 10, but not with the piston 14.

The piston 14 has a hole 17 therethrough, which allows a fluid communication pathway between the chambers. On the outer flange 14a of the piston 14, the hole 17 has a counterbore 18. As will be seen, the counterbore 18 is designed to receive the inner end of the piston rod 11. This arrangement helps to provide lateral guidance for the inner end of the piston rod 11 in its reciprocal movement within the cylinder 10.

The counterbore 18 is of slightly larger cross-section than the inner end of the piston rod 11, which means that there is a small pathway between the two for the passage of damping fluid between the chambers.

A collar 19 is seen on the piston rod 11 towards its inner end. The collar 19 is preferably of metal and is formed on or attached to the piston rod 11 by suitable means such as stamping or moulding. The purpose of the collar 19 is to spread the load on the piston 14 when a force, e.g. from a closing door, acts on the piston rod 11. This is an important consideration, because the fluid pressures that occur in damper assemblies of this nature can be quite substantial and because plastics components can distort and break or jam in the cylinder if they are not adequately supported.

The collar 19 is designed to engage the axial end face of the outer flange 14a with its annular surface. The cross-sectional area of the annular surface of the collar 19 is at least twice as big as the cross-sectional area of the piston rod 11, and preferably four or five times as big.

A resiliently collapsible element 20 of known design is contained within one of the chambers. The purpose of this element 20 is to compensate for changes in volume in the cylinder 10 that result from movements of the piston 14.

The cylinder 10 has a number of relief channels 21 extending axially in the surface of its bore. The channels 21 are arranged to taper in depth towards the closed end of the cylinder 10, i.e. their depth decreases progressively in this direction. The purpose of these channels 21 is to allow a progressively variable amount of fluid communication between the chambers as the piston 14 moves axially within the cylinder 10 and hence produce a progressive variation in the damping resistance provided by the assembly.

In operation, the assembly will normally be in the position seen in FIG. 1, with its piston rod 11 fully extended from the cylinder 10. When the distal end of the piston rod 11 is struck, e.g. by a closing door, this will cause the piston rod 11 to force the piston 14 towards the closed end of the cylinder 10, against the bias of the spring 15. At the same time, the outer flange 14a of the piston 14 will move into engagement with the seal 16, thus closing off the fluid pathway between the outer flange and the cylinder 10. Thereupon, the main remaining pathway for the passage of damping fluid between the chambers is through the gap between the counterbore 18 and the inner end of the piston rod 11. The thus restricted flow of damping fluid between the two chambers provides a damped resistive force to the movement of the piston rod 11.

This is not in fact the only pathway for the passage of damping fluid across the piston 14 in the working stroke of the assembly, because a certain amount can also leak through the relief channels 21. However, the amount of such leakage is designed to decrease over the working stroke due to the tapering form of the relief channels 21. Otherwise, the magnitude of the damping force that the assembly is able to exert is basically determined by the size of the fluid pathway between the counterbore 18 in the piston 14 and the inner end of the piston rod 11.

When the force on the distal end of the piston rod 11 has dissipated, the piston rod will be returned to its extended position by the biasing force of the spring 15 acting on the piston 14. This movement moves the seal 16 from its engagement with the outer flange 14a of the piston 14 into engagement with the inner flange 14b. In this position, a far greater degree of fluid communication is opened up between the two chambers. This greatly eases the flow of damping fluid across the piston 14 and thus means that on the return movement of the piston rod 11, there is little effective damping resistance.

The damper assembly seen in FIG. 3 is similar to the FIG. 1 assembly, but in this embodiment, the damping action is capable of being adjusted. This is enabled by the provision of a composite piston 30 comprising first and second piston parts 31, 36.

The first piston part 31 is much like the piston 14 of the FIG. 1 embodiment. It is of plastics material and has axially spaced apart flanges 31a, 31b with a seal 32, preferably in the form of an O-ring, positioned in between. The outer diameter of the flanges 31a, 31b is slightly smaller than the bore of the cylinder 33, so that the first piston part 31 is free to reciprocate axially within the cylinder. The gap between the circumferential edges of the flanges 31a, 31b and the inner wall of the cylinder 33 provides a pathway for passage of damping fluid. The first piston part 31 has a bore 34 therethrough for the passage of damping fluid, with a counterbore 35 in its outer flange 31a.

The second piston part 36 is preferably made of metal and may be formed on the piston rod 29 or attached to it by suitable means such as stamping or insert moulding. Because it is made of metal, the second piston part 36 is effectively able to act like the collar 19 in the FIG. 1 embodiment to spread the load acting on the first piston part 31 resulting from forces transmitted by the piston rod 29. In an alternative design, however, the second piston part 36 could also be made of plastics material. In that event, a metal collar 28 would preferably be formed on or attached to the piston rod 29 in order to fulfil the same load-spreading function.

The counterbore 35 of the first piston part 31 is designed to receive a spigot 36a extending from the second piston part 36. The counterbore here is tapered, i.e. of conical section, whereas the spigot 36a is of regular cylindrical section. It will be appreciated that this arrangement means that the gap between the spigot 36a and the counterbore 35 can be varied by adjusting the extent to which the spigot extends into the counterbore. This gap forms the main means by which the chambers to either side of the piston are in fluid communication during the active stroke of the piston rod, i.e. on compression of the assembly (the cylinder may again include tapering relief channels 43 similar to the channels 21 in the FIG. 1 embodiment). Therefore, adjustment of the size of this gap basically controls adjustment of the damping characteristic of the assembly.

The engagement of the spigot 36a in the counterbore 35 also helps to provide lateral guidance for the inner end of the piston rod 29 in its movement in the cylinder 33.

The axial position of the spigot 36a within the counterbore 35 is governed by a camming mechanism between the piston parts 31, 36. As seen in FIGS. 4 and 5, the opposing axial end faces of the piston parts 31, 36 are provided with opposing pairs of helically extending tracks 38, 39. This means that when the angular orientation of one piston part 31, 36 is altered with respect to the other, the camming action of the opposing helical tracks 38, 39 will alter the axial displacement of the spigot 36a within the counterbore 35.

The first piston part 31 is prevented from rotating relative to the cylinder 33. For this purpose, as will be seen in FIG. 4, the first piston part 31 has a pair of lugs 37 disposed on diametrically opposed locations on the outer periphery of the outer flange 31a. These lugs 37 are designed to engage in a pair of axially extending grooves 40 in the inner surface of the bore of the cylinder 33. The second piston part 36 is also effectively prevented from rotating relative to the cylinder in normal operation of the assembly. This is achieved by virtue of the sealing engagement of the piston rod 29 with the seal 41 in the cylinder end cap 42.

The pitch of the helical tracks 38, 39 is relatively low, so that only a very small amount of axial displacement is produced per degree of relative rotation of the piston parts 31, 36. This enables adjustment of the critical gap between the spigot 36a and the counterbore 35 to be fine tuned to small tolerances.

The invention claimed is:

1. A damper assembly comprising a damper with a piston mounted for reciprocal movement in a cylinder containing damping fluid, with the piston being acted upon by a piston rod having an inner end, wherein the piston rod comprises a reaction surface engaging the piston spaced from the inner end, with a cross-sectional area of the reaction surface being greater than a cross-sectional area of the piston rod in order to spread the load exerted on the piston, and wherein the piston includes a bore slideably receiving the inner end of the piston rod in a manner to provide lateral guidance for the inner end of the piston rod in its movement in the cylinder, with the piston being biased in the cylinder toward the reaction surface.

2. A damper assembly as claimed in claim 1 wherein the piston is made of plastics material and the reaction surface is made of metal.

3. A damper assembly as claimed in claim 2 wherein the reaction surface is provided by a collar attached to or formed on the piston rod.

4. A damper assembly as claimed in claim 1 wherein the piston has a hole extending axially therethrough away from the piston rod for passage of damping fluid.

5. A damper assembly as claimed in claim 4 wherein the bore includes the hole extending axially therefrom away from the piston rod, with the hole of a smaller cross section size than the bore, and wherein the hole in the piston is partly occluded by the piston rod or a part connected thereto, with a gap between the hole and the piston rod or a part connected thereto defining a pathway for the passage of damping fluid.

6. A damper assembly as claimed in claim 5 and further comprising means for adjusting a size of the pathway.

7. A damper assembly comprising a damper with a piston mounted for reciprocal movement in a cylinder containing damping fluid, wherein the piston has a hole therethrough for passage of damping fluid, with the piston being acted upon by a piston rod having an inner end, wherein the piston rod comprises a reaction surface engaging the piston spaced from the inner end, with a cross-sectional area of the reaction surface being greater than a cross-sectional area of the piston rod in order to spread the load exerted on the piston, and wherein the piston includes a bore slideably receiving the inner end of the piston rod in a manner to provide lateral guidance for the inner end of the piston rod in its movement in the cylinder, with the piston being biased in the cylinder toward the reaction surface, wherein the bore includes the hole wherein the hole in the piston is partly occluded by the piston rod or a art connected thereto, with a gap therebetween defining a pathway for the passage of damping fluid; and means for adjusting a size of the pathway, wherein the adjusting means includes a tapering section of the hole through the piston.

8. A damper assembly as claimed in claim 7 wherein the inner end of the piston rod or the part connected thereto is insertable into the tapering section of the hole and the adjusting means includes a mechanism for controlling the extent of said insertion.

9. A damper assembly as claimed in claim 8 wherein the inner end of the piston rod or the part connected thereto is insertable axially into the tapering section of the hole.

10. A damper assembly as claimed in claim 9 wherein the controlling mechanism includes a caroming surface on one of the piston and the piston rod or the part connected thereto and camming with another of the piston and the piston rod or the part connected thereto.

11. A damper assembly as claimed in claim 10 wherein the camming surface is arranged on an axial end face of the piston and extends helically with respect to the piston rod.

12. A damper assembly as claimed in claim 11 wherein the camming surface on the piston is arranged to engage a corresponding helically extending camming surface on the piston rod or the part connected thereto.

13. A damper assembly as claimed in claim 12 and further comprising means for preventing the piston from rotating relative to the cylinder.

14. A damper assembly as claimed in claim 12 and further comprising means for preventing the piston rod from rotating relative to the cylinder.

15. A damper assembly as claimed in claim 11 wherein a pitch of the camming surface produces axial displacement per degree of rotation.

16. A damper assembly comprising a damper with a piston mounted for reciprocal movement in a cylinder containing damping fluid, wherein the piston divides the interior of the cylinder into two chambers and has a bore therethrough for passage of damping fluid between the two chambers, wherein the piston is biased towards and is engaged by a piston rod or a part connected thereto partly located in the bore, wherein a gap is defined between a part of the piston and the piston rod or the part connected thereto; and means for adjusting the size of said gap, wherein the bore in the piston has a tapered section and the piston rod or the part connected thereto is partly located therein.

17. A damper assembly as claimed in claim 16 wherein the adjusting means includes a mechanism for controlling the axial position of the piston rod relative to the piston.

18. A damper assembly as claimed in claim 17 wherein the controlling mechanism includes a camming surface on one of the piston and the piston rod or the part connected thereto and caroming with another of the piston and the piston rod or the part connected thereto.

19. A damper assembly as claimed in claim 18 wherein the caroming surface is arranged on an axial end face of the piston and extends helically with respect to the piston rod.

20. A damper assembly as claimed in claim 19 wherein the camming surface on the piston is arranged to engage a corresponding helically extending camming surface on the piston rod or the part connected thereto.

21. A damper assembly as claimed in claim 20 and further comprising means for preventing the piston from rotating relative to the cylinder.

22. A damper assembly as claimed in claim 20 and further comprising means for preventing the piston rod from rotating relative to the cylinder.

23. A damper assembly as claimed in 19 wherein a pitch of the camming surface produces axial displacement per degree of rotation.

* * * * *